Patented Nov. 7, 1944

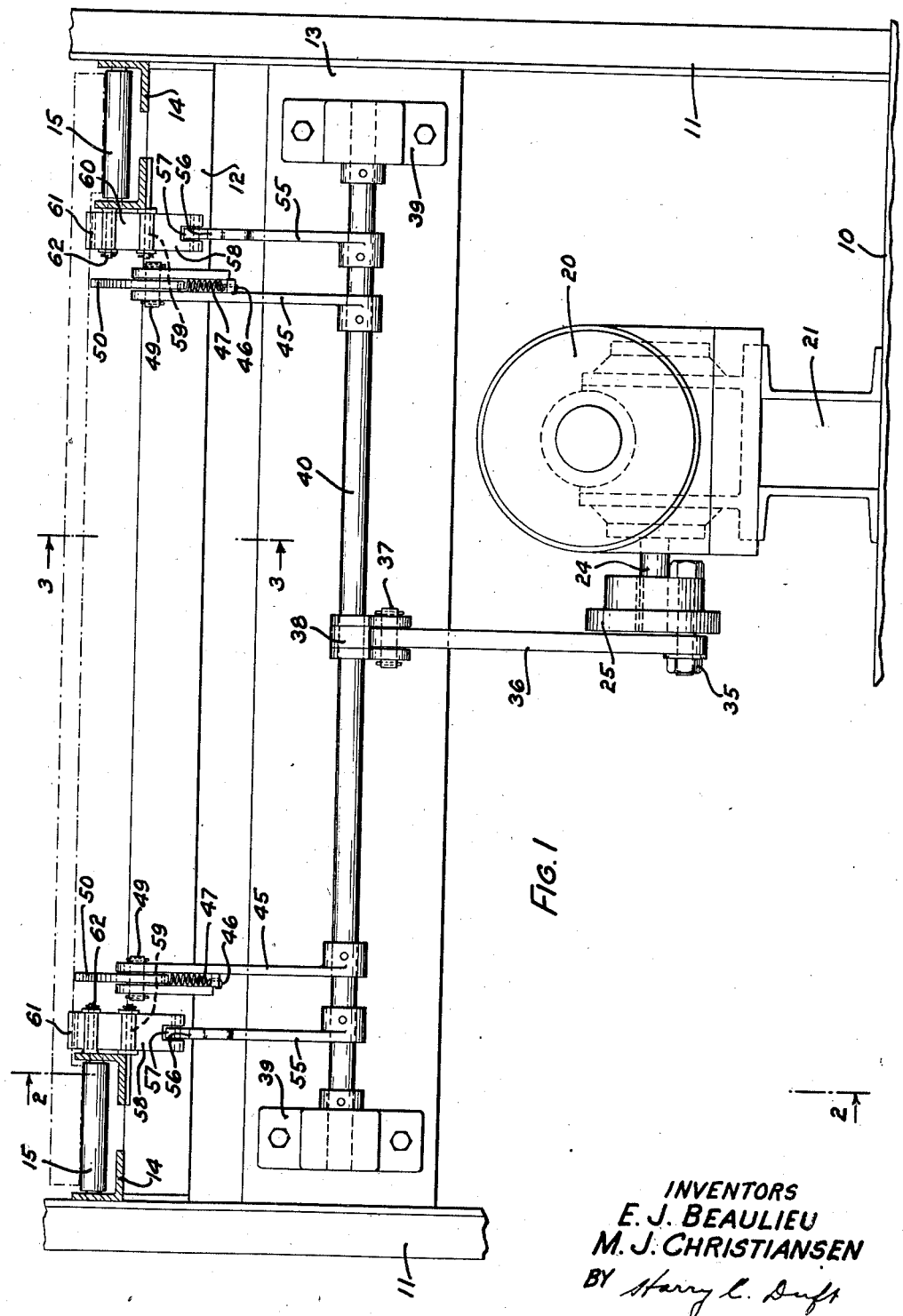

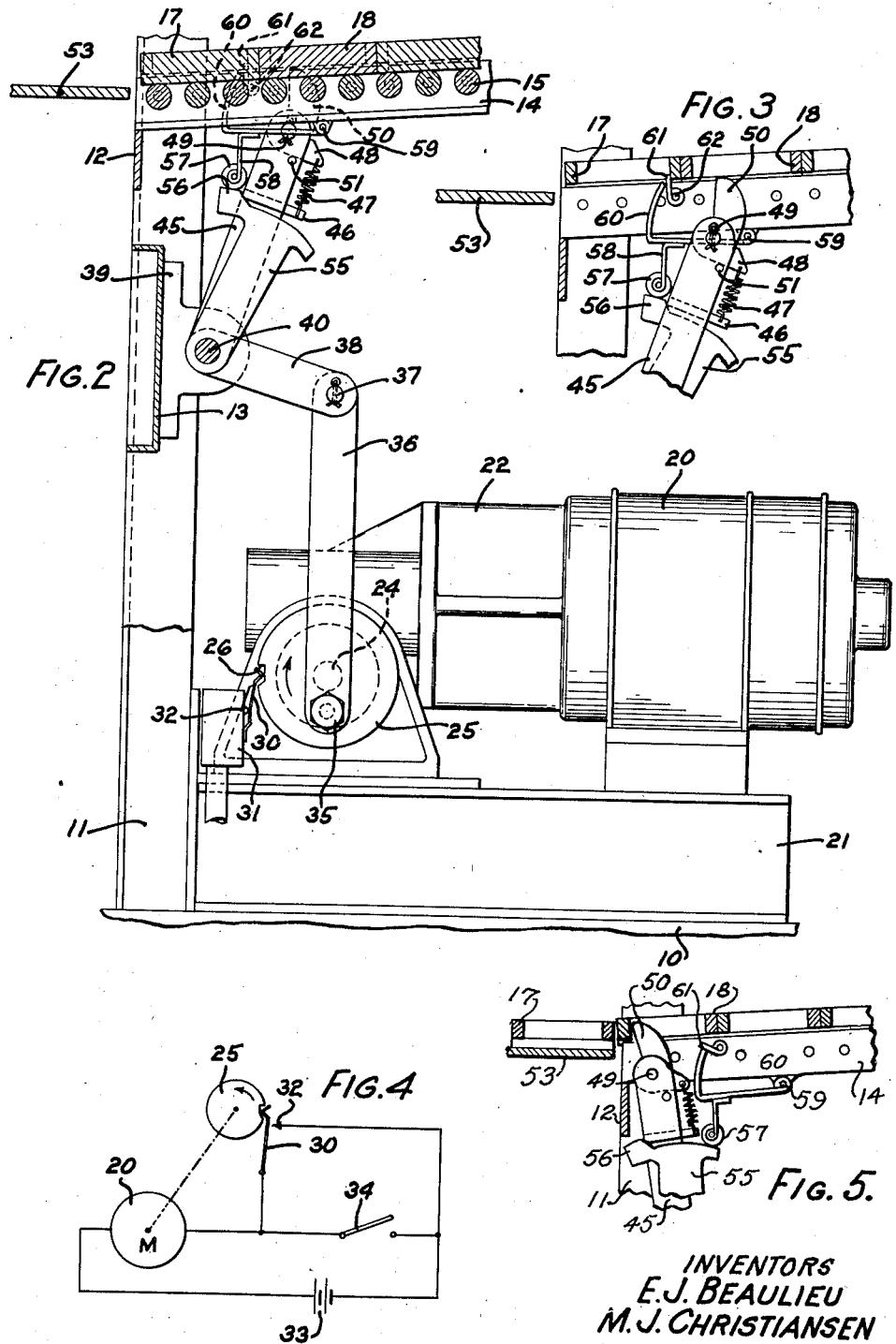

2,362,043

UNITED STATES PATENT OFFICE 2,362,043

ARTICLE HANDLING APPARATUS

Ezra J. Beaulieu, Downers Grove, and Milton J. Christiansen, Chicago, Ill., assignors to Western Electric Company, Incorporated, New York, N. Y., a corporation of New York Application April 10, 1942, Serial No. 438,440

4 Claims. (198—26)

This invention relates to article handling apparatus and more particularly to a transfer mechanism for a conveyor system.

In conveyor systems where articles are temporarily stored on a rack and then transferred to a conveyor belt one at a time, various means have been provided for releasing the articles and positioning them on the conveyor belt. Such means may comprise a power operated transfer arm having a retaining mechanism associated therewith to hold back the line of succeeding articles. However, some difficulty has occasionally been experienced due to interference of the retained articles with the conveyor belt or with the transferred article.

It is an object of the present invention to provide an improved article transferring mechanism.

This invention may be embodied in a conveyor system having an inclined storage rack provided with a pair of oscillatory transfer arms, the arms extending above the rack a sufficient distance to engage articles supported by the rack. The arms are operated by a crank fixed to the output shaft of a motor driven speed reducer and having means associated therewith for controlling the operation of the motor. A cam operated retaining pawl is also driven by the crank and serves to pull back the line of articles on the rack after the transfer of one article to the conveyor belt.

Other objects and advantages of this invention will be apparent from the following detailed description taken in conjunction with the accompanying drawings, wherein:

Fig. 1 is a rear elevation partly in section showing a transfer mechanism;

Fig. 2 is a side elevation partly in section of the mechanism shown in Fig. 1, the section being taken along the line 2—2 of Fig. 1;

Fig. 3 is a fragmentary sectional view along the line 3—3 of Fig. 1, showing the upper portion of the transfer mechanism;

Fig. 4 is a schematic view of the circuit that may be used with this mechanism; and Fig. 5 is a view similar to Fig. 3, showing, however, the position of the transfer and retracting mechanisms as an article is deposited on the conveyor.

In the embodiment of this invention shown in the drawings, a transfer mechanism is provided having a base 10 upon which are mounted standards 11 to which are attached cross beams 12 and 13. Two pairs of V-shaped beams 14 are mounted at right angles to the cross beams 12 and at a slight inclination to the base 10. Each pair of beams 14 serves as an inclined support for rollers 15 which are rotatably mounted therebetween. Several articles are shown on the storage rack, the first in line being designated by the number 17, and the second by the number 18.

Power for this transfer mechanism is supplied by a motor 20 which is supported on a block 21 mounted on the base 10 and which is connected to a speed reducer 22 also mounted on block 21. A crank disc 25 is keyed to an output shaft 24 on this speed reducer and is provided with a notch 26 at its outer edge. The free end of a spring 30 mounted on a switch block 31 contacts the surface of the disc 25 so as to engage, in the course of a revolution of the discs, the notch 26. A normally open switch 32 is mounted in the switch block in such a way as to be closed by the spring 30 when the free end of the spring leaves the notched portion of the disc due to the rotation of the disc. Fig. 4 indicates the circuit used in controlling the operation of the motor.

A link 36 is attached to the crank disc 25 by a bolt 35 at its lower end and at its upper end is pivotally connected to one end of a second link 38 by a pivot 37. The link 38 is in turn fixed to a shaft 40 journalled in a pair of bearing blocks 39 which are mounted on the cross beam 13. A pair of oscillatory transfer or pusher arms 45 are also keyed to the shaft 40 and are each provided with a transfer finger 50 which is pivotally attached to the upper end of the arm by a pivot 49. The transfer finger engages the base of the article 18 behind the article 17 to be transferred when the transfer arms are moved forward. The fingers are normally held upright by springs 47, each of which is attached to a projection 46 on each transfer arm at its lower end and to a projection 48 on each transfer finger at its upper end. A stop 51 is also positioned on the upper portion of each transfer arm and prevents the associated transfer finger from being pulled back too far in a clockwise direction as shown in Fig. 2 by the spring. These fingers are pivoted so that, after they have advanced the articles 17 and 18 and thus positioned the front article on a conveyor belt 53, which runs at right angles to the transfer mechanism, as the fingers are returned to the starting position, they will be moved downwards and out of the way by the weight of the succeeding articles moving forward by gravity on the inclined rollers.

Cams 55 are also fixed to the shaft 40 and operate a pair of retaining pawls 60 through a projection 56 on the upper end of each cam which engages a roller 57 rotatably attached to a small bracket 58 mounted underneath and supporting each pawl. The pawls are in turn pivotally mouned on the V-shaped beams 14 by pivots 59. Retaining fingers 61 are also pivotally attached to the V-shaped beams 14 by pivots 62 and are moved into operating position by the pawls. In the operation of this device, the retaining fingers 61 serve both to retain and pull back non-transferred articles after each transfer of an article onto the conveyor, being raised into position by the pawls 60.

In the operation of this device, an operator may manually close a switch 34 shown schematically in Fig. 4, thus connecting the motor 20 to a current supply 33. The motor drives the crank disc 25 through the speed reducer 22 and as the disc revolves, the spring 30 leaves the notched portion of the disc and the switch 32 is closed. The notch on the disc is cut so that this switch is closed for about 330° of the 360° represented by one rotation of the disc. This permits the oscillatory transfer arms associated with the motor to deliver one article to the conveyor belt and then at the end of the revolution, since the spring again drops into the notch 26 on the disc, the switch 32 is opened, thus breaking the circuit, the manually operated switch 34 having been opened by the operator as soon as the motor had started. A spring set solenoid operated brake may be associated with the motor to obtain quick and accurate stopping.

As may be seen in Fig. 2, at the starting position when a number of articles are on the storage rack rollers, the retaining fingers 61 are held against the inside rear portion of the first article in line by means of the retaining pawls. When the motor starts its cycle of operation, the shaft 40 is rotated in a counter-clockwise direction through the links 36 and 38 as viewed in Fig. 1; the transfer arms being fixed thereto, move the transfer fingers forward. At the same time, the cam 55, which is also keyed to the shaft 40, is moved forward, permitting the rollers 57 and associated pawls 60 to pivot downwards, thus permitting the retaining fingers also to pivot downwards and to release the article first in line. As the shaft continues to rotate, the transfer fingers engage the base of the second article in line and move it forward. This article engages the rear of the first article; hence the transfer fingers by moving this article forward, thereby move the first article in line forward also. The fingers move the second article a sufficient distance to position the first article on the conveyor belt 53. When the crank 25 has completed a half of a revolution, the link 36 is raised to its highest position and consequently the counter-clockwise rotation of shaft 40 is halted. At this point the end of the second article extends a slight distance beyond the storage rollers, this being necessary in order to position the transferred article a sufficient distance away from the storage rollers so as not to collide therewith. Continued rotation of the crank 25 causes the shaft 40 to be rotated in a clockwise direction, thus reversing the direction of movement of the transfer arms and associated mechanisms. The article used in positioning the first article on the conveyor belt is then retracted by the retaining pawls and associated fingers which, as the retaining pawls are raised by the cams, engage the article and pull it back a short distance. Succeeding articles, also stored on the rolls, will, of course, be pulled back simultaneously the same distance. As the transfer fingers are returned to the starting position by the arms 45, these fingers are pivoted against the tension of the spring 47 by the succeeding articles rolling downwards and forwards to the transfer position, the spring being of such strength that the weight of the articles on the rollers pressing against these fingers is sufficient to cause the springs to permit the fingers to pivot downwards. Although in this embodiment of the invention, the transfer fingers have been described as engaging the second article in line, it will be understood that the fingers might engage the first article or other articles further back.

While but one embodiment of this invention has been shown, it will be understood that many changes may be made therein without departing from the spirit and scope of the invention.

What is claimed is:

1. An article transfer apparatus comprising means for supporting articles to be transferred, a pusher arm having a pivotable upper member which advances the articles to be transferred, a cam operated pawl associated with said pusher arm, and a pivotable member operated by said pawl for retaining and retracting non-transferred articles.

2. An article transfer apparatus comprising a conveying means, means for supporting a line of articles to be transferred to said conveying means, a transfer means for transferring an article therefrom, said transfer means engaging another of said articles and advancing the latter article a sufficient distance for the latter article to position the article to be transferred on the conveying means, and means actuated by said transfer means for retracting said latter article after positioning the article to be transferred on said conveying means a sufficient distance to prevent interference with the transferred article.

3. An article transfer apparatus comprising a conveying means, means for supporting a line of articles to be transferred to said conveying means, a transfer arm for transferring an article from said supporting means to said conveying means, said transfer arm engaging another of said articles and advancing the latter article to position the article being transferred on the conveying means, means for operating said transfer arm, means carried by said article supporting means for retracting said latter article after positioning the transferred article on the conveying means, said retracting means retracting said latter article a sufficient distance to prevent interference with the transferred article, said retracting means being operated by said transfer means operating means, and means associated with said operating means for initiating and for limiting the operation of said operating means.

4. An article transfer apparatus comprising means for supporting an article to be transferred, an article transfer arm having a pivotable finger for advancing an article on said supporting means and for transferring an article, a stop on said arm for limiting the pivotal movement of said finger in one direction, a spring for holding said finger normally against said stop, a pivotable retracting member associated with said article supporting means for moving non-transferred articles in a direction opposite to the direction of transfer to prevent interference of the non-transferred articles with the transferred articles, means for operating said article transfer means, and means for operating said article retracting means.

EZRA J. BEAULIEU.
MILTON J. CHRISTIANSEN.